United States Patent [19]

Fritzsche

[11] Patent Number: 4,912,833

[45] Date of Patent: Apr. 3, 1990

[54] METHOD OF FORMING AN EDGEWISE WOUND CORE AND METHOD OF OPERATING APPARATUS

[75] Inventor: Harold L. Fritzsche, Fort Wayne, Ind.

[73] Assignee: General Electric Company, Fort Wayne, Ind.

[21] Appl. No.: 264,523

[22] Filed: Oct. 31, 1988

Related U.S. Application Data

[62] Division of Ser. No. 79,379, Jul. 30, 1987, Pat. No. 4,816,711, which is a division of Ser. No. 782,486, Oct. 1, 1985, Pat. No. 4,688,413, which is a division of Ser. No. 660,211, Oct. 12, 1984, Pat. No. 4,613,780.

[51] Int. Cl.⁴ .............................................. H02K 15/02
[52] U.S. Cl. .................................... 29/596; 29/605; 72/135; 72/142
[58] Field of Search ................... 29/596, 598, 605; 72/135, 142

[56] References Cited

U.S. PATENT DOCUMENTS

| | | | |
|---|---|---|---|
| 1,920,354 | 8/1933 | Carpenter | 171/252 |
| 2,908,965 | 10/1959 | Platt | 29/155.5 |
| 3,062,267 | 11/1962 | Hart et al. | |
| 3,095,774 | 7/1963 | Hart | |
| 3,152,629 | 10/1964 | Rediger | 72/142 |
| 3,206,964 | 9/1965 | Hart et al. | 72/142 |
| 3,320,451 | 5/1967 | Wiley | 310/216 |
| 3,577,851 | 5/1971 | Detheridge | 310/216 |
| 3,708,706 | 1/1973 | Akiyama | 310/216 |
| 3,842,493 | 10/1974 | Ohuchi et al. | 29/596 |
| 3,886,256 | 5/1975 | Ohuchi | 310/216 |
| 4,116,033 | 9/1978 | Iwaki et al. | 72/142 |
| 4,613,780 | 9/1986 | Fritzsche | 310/216 |

FOREIGN PATENT DOCUMENTS

| | | | |
|---|---|---|---|
| 85905345.6 | 10/1985 | European Pat. Off. | |
| 0851655 | 8/1952 | Fed. Rep. of Germany | 310/216 |
| 0111603 | 8/1979 | Japan | 310/216 |
| 6050473 | 10/1985 | Japan | |
| WO/8602501 | 10/1985 | PCT Int'l Appl. | |
| 1096730 | 6/1984 | U.S.S.R. | 310/259 |

Primary Examiner—Carl E. Hall
Attorney, Agent, or Firm—Ralph E. Krisher, Jr.

[57] ABSTRACT

A method for forming an edgewise wound core from a lanced strip of generally thin ferromagnetic material. The lanced strip includes a pair of sets of segments extending generally lengthwise thereof with the segments of one of the segment sets being integrally interposed between the segments of the other of the segment sets, and a set of salient pole teeth are integral with the segments of the one segment set extending generally laterally therefrom. In practicing this method, successive segments of the other segment set are successively and independently edgewise constrained, and the salient pole teeth and segments of the one segment set are unconstrained. Only the edgewise constrained segments of the other segment set are edgewise deformed, and the unconstrained salient pole teeth and segments of the one segment set are maintained in their original lanced configurations.

A method of operating apparatus for continuously forming edgewise wound cores is also disclosed.

51 Claims, 5 Drawing Sheets

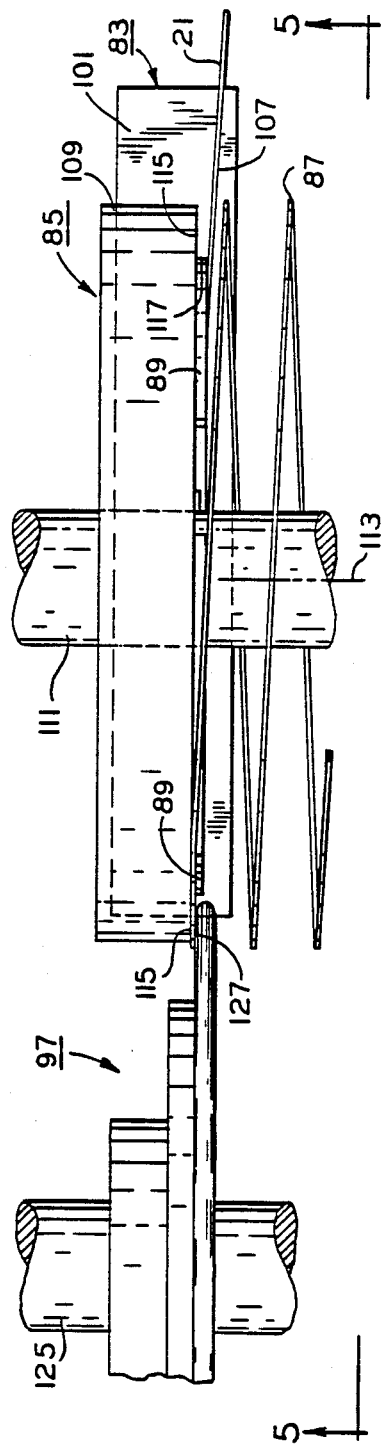
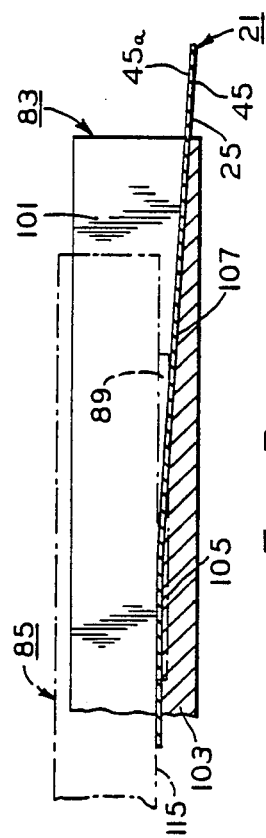
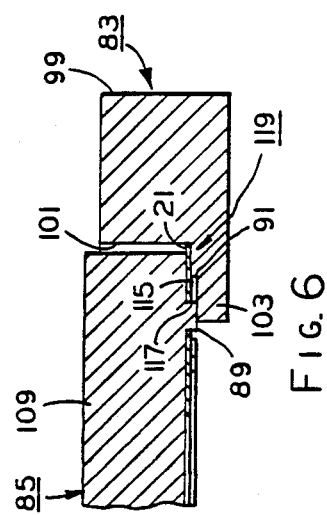
FIG. 4
FIG. 7
FIG. 6

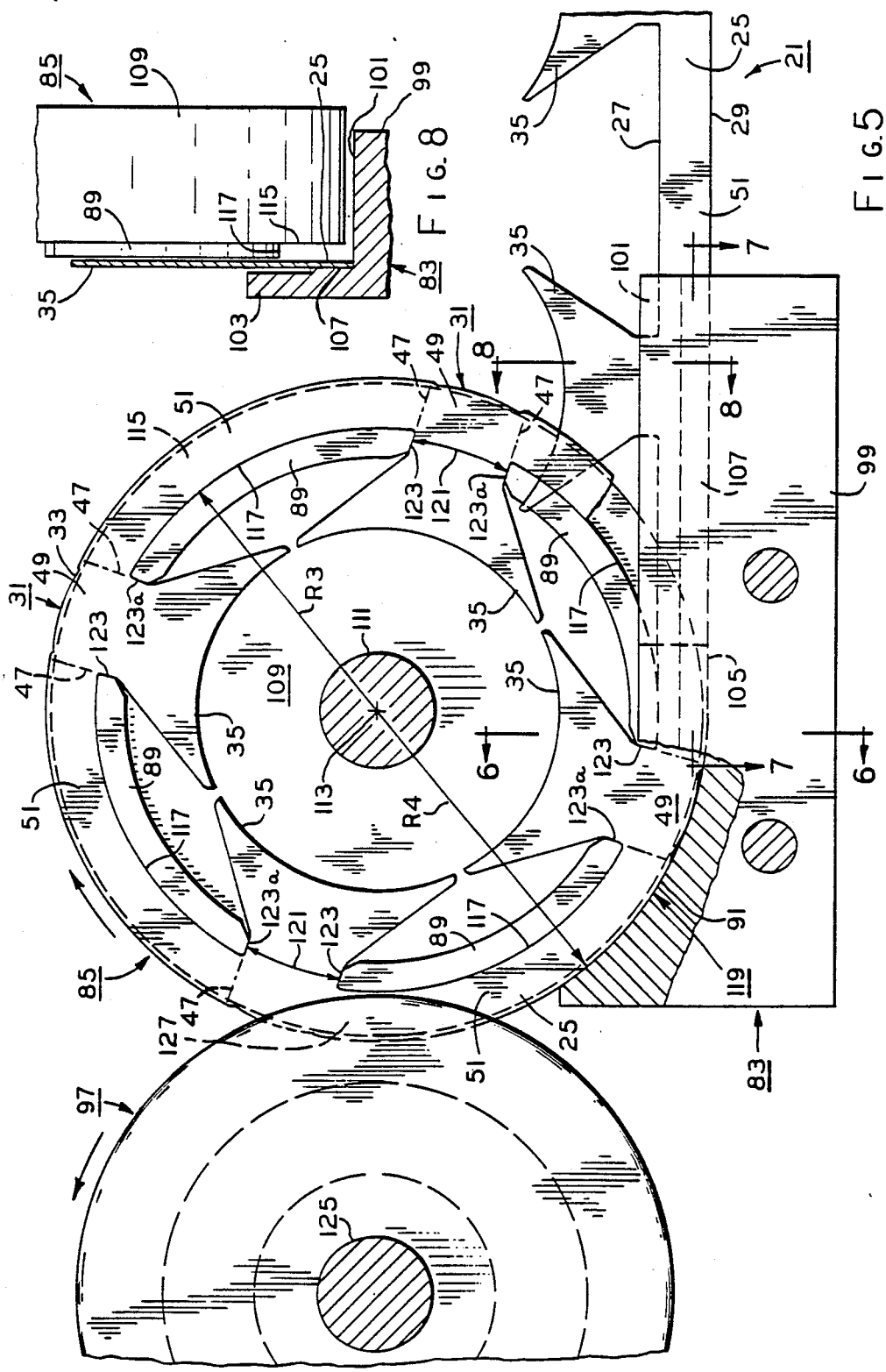

METHOD OF FORMING AN EDGEWISE WOUND CORE AND METHOD OF OPERATING APPARATUS

This application is a division of the copending commonly assigned parent application Ser. No. 079,379 filed July 30, 1987 (now U.S. Pat. No. 4,816,711 issued Mar. 28, 1989) which is a division of grandparent application Ser. No. 782,486 filed Oct. 1, 1985 (now U.S. Pat. No. 4,688,413 issued Aug. 25, 1987) which, in turn, was a continuation-in-part of the commonly assigned great grandparent application Ser. No. 660,211 filed Oct 12, 1984 (now U.S. Pat. No. 4,613,780 issued Sept. 23, 1986), and such parent, grandparent and great grandparent applications are each incorporated by reference herein. This application is also related to the commonly assigned application Ser. No. 660,101 filed Oct. 12, 1984 (now U.S. Pat. No. 4,712,292, issued Dec. 15, 1987), Ser. No. 660,116 filed Oct. 12, 1984 (now U.S. Pat. No. 4,643,012 issued Feb. 17, 1987) and Ser. No. 680,762 filed Dec. 12, 1984 (now U.S. Pat. No. 4,622,835 issued Nov. 18, 1986) which are also incorporated herein by reference, respectively.

FIELD OF THE INVENTION

This invention relates in general to dynamo-electric machines and in particular to methods of forming an edgewise wound core and methods of operating apparatus for continuously forming edgewise wound cores.

BACKGROUND OF THE INVENTION

In the past various different apparatus and methods have been utilized for effecting the edgewise deformation of a continuous lanced strip of generally thin ferromagnetic material into a plurality of generally helical convolutions thereof and accumulating such helical convolutions into a generally annular stack thereof so as to form an edgewise wound core for a dynamoelectric machine. Further, at least some of the aforementioned past apparatus and methods have been utilized to edgewise wind non-salient or distributed field cores of the usual type having teeth extending radially inwardly from a circumferential yoke section and also of the inside-out type with the teeth extending radially outwardly from the yoke section. Of course, the distributed field edgewise wound core has a relatively large number of teeth per helical convolution of the continuous lanced strip, such as for instance twenty-four teeth or more per helical convolutions, and such teeth are relatively narrow in width between the tips thereof and the yoke section.

Others of the aforementioned past apparatus and methods have been utilized to edgewise wind salient pole cores of the inside-out type with the salient pole pieces thereof extending radially outwardly from the yoke section. In comparison with the teeth of the distributed field edgewise wound core, the salient pole pieces of the salient pole edgewise wound core are appreciably fewer in number, such as for instance two, four, six or eight pole pieces per helical convolution, and the width or arcuate length of the salient pole pieces between the tips thereof and the yoke section may be appreciably greater than that of the teeth of the distributed field edgewise wound core.

It is believed, however, that some difficulties or problems may have been encountered in the past in attempting to edgewise wind a salient pole core from a continuous lanced strip of generally thin ferromagnetic material with the salient pole pieces of such salient pole core extending radially inwardly from a circumferential yoke section thereof. For instance, the bore defining free end edge on each salient pole piece of a four pole salient pole edgewise wound core may extend through an arc of up to at least about eighty-seven degrees about the bore of such core. Due to the above discussed relatively large width of the free end edge or tip of each salient pole piece, it is believed that interfering engagement of such salient pole piece tips on the continuous lanced strip with parts of the edgewise winding apparatus may have been encountered resulting in the aforementioned problem in past attempts to edgewise wind a salient pole core with the salient pole pieces extending radially inwardly from the circumferential yoke section. Another problem which may have been encountered in past attempts to edgewise wind a salient pole core is believed to be that such cores may not have had a generally uniform circumferential surface about the yoke section thereof.

SUMMARY OF THE INVENTION

Among the several objects of the present invention may be noted the provision of forming an edgewise wound core, and an improved method of operating apparatus for continuously forming edgewise wound cores which overcome, at least in part, the problems or difficulties discussed above, as well as others, with respect to the prior art; the provision of such improved methods in which only preselected spaced apart segments in the yoke section of the lanced strip are generally edgewise or arcuately deformed to effect the edgewise deformation of the lanced strip into a plurality of generally helical convolutions thereof; the provision of such improved methods in which other segments in the yoke section of the lanced strip integrally interposed between the deformed segments remain undeformed; the provision of such improved methods in which a set of spaced apart salient pole pieces on the lanced strip and integral with the undeformed segments in the yoke section are also undeformed; the provision of such improved methods in which at least the salient pole pieces on the lanced strip are deflected or canted to obviate interfering engagement with parts of the apparatus during the edgewise winding of the core; and the provision of such improved methods in which the component parts utilized therein are simple in design, easily assembled and economically manufactured. These as well as other objects and advantageous features of the present invention will be in part apparent and in part pointed out hereinafter.

In general, a method in one form of the invention is provided for forming an edgewise wound core from a lanced strip of generally thin ferromagnetic material. The landed strip includes a pair of sets of segments extending generally lengthwise thereof with the segments of one of the segment sets being integrally interposed between the segments of the other of the segment sets and a set of salient pole teeth integral the segments of one of the one and other segment sets and extending generally laterally therefrom, respectively. In the practice of this method, successive segments of the other of the one and other segment sets are successively and independently edgewise constrained along at least a part thereof, and the salient pole teeth and the segments of the one and the one and other segment sets are left unconstrained. Only the at least parts of the edgewise constrained segments of the other of the one and other segment sets are successively and independently edgewise deformed, and the unconstrained salient pole teeth and the segments of the one of the one and other segment sets are maintained in the original lanced configuration, respectively.

Also in general and in one form of the invention, a method is provided for operating apparatus for continuously forming edgewise wound cores from a continuous lanced strip of generally thin ferromagnetic material. The continuous lanced strip includes a yoke section extending generally lengthwise thereof, a pair of generally opposite edges on the yoke section, and a set of spaced apart salient pole teeth integral with one of the opposite edges on the yoke section and extending generally laterally therefrom, respectively. The apparatus including a die having an arcuate surface therein and a rotatable arbor having a set of arcuate projections thereon, respectively. In practicing this method, the arbor is rotated relative to the die with at least the yoke section of the continuous lanced strip being passed therebetween. The arcuate projections on the arbor are successively engaged only with at least parts of the one opposite edge on the yoke section of the continuous lanced strip between adjacent ones of the teeth, and only parts of the other of the opposite edges on the yoke section disposed generally opposite the parts of the one opposite edge successively engaged by the arcuate projections are thereby successively constrained in engagement with the arcuate surface of the die so as to effect edgewise deformation of the continuous lanced strip into a plurality of generally helical convolutions thereof in response to the rotation of the arbor relative to the die, respectively.

BRIEF DESCRIPTION OF THE DRAWINGS

FIG. 4 is a side elevational view showing parts of the apparatus of FIG. 3;

FIG. 5 is a partial sectional view taken along line 5—5 in FIG. 4;

FIGS. 6, 7 and 8 are partial sectional views taken along lines 6—6, 7—7 and 8—8 in FIG. 5, respectively;

Corresponding reference characters indicate corresponding parts throughout the several views of the drawings.

The exemplifications set out herein illustrate the preferred embodiments of the invention in one form thereof, and such exemplifications are not to be construed as limiting either the scope of the invention or the scope of the disclosure in any manner.

DETAILED DESCRIPTION OF THE PREFERRED EMBODIMENTS

Figure 1:
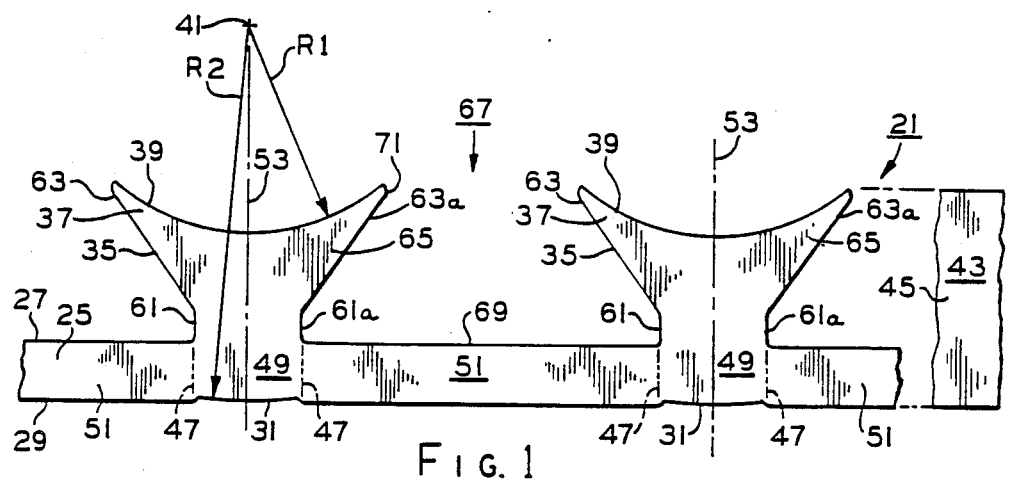
FIG. 1 is a front elevational view showing a part of a lanced strip formed from strip stock of a generally thin ferromagnetic material.
Figure 2:
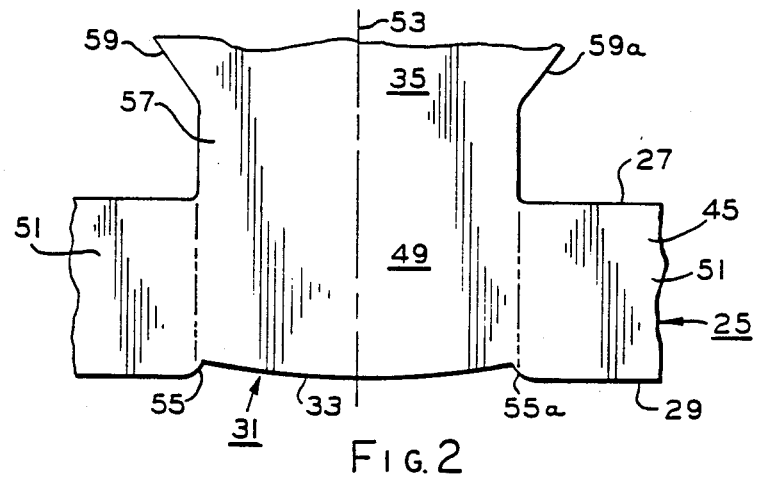
FIG. 2 is an enlarged partial front elevational view of the lanced strip of FIG. 1.
Figure 10:
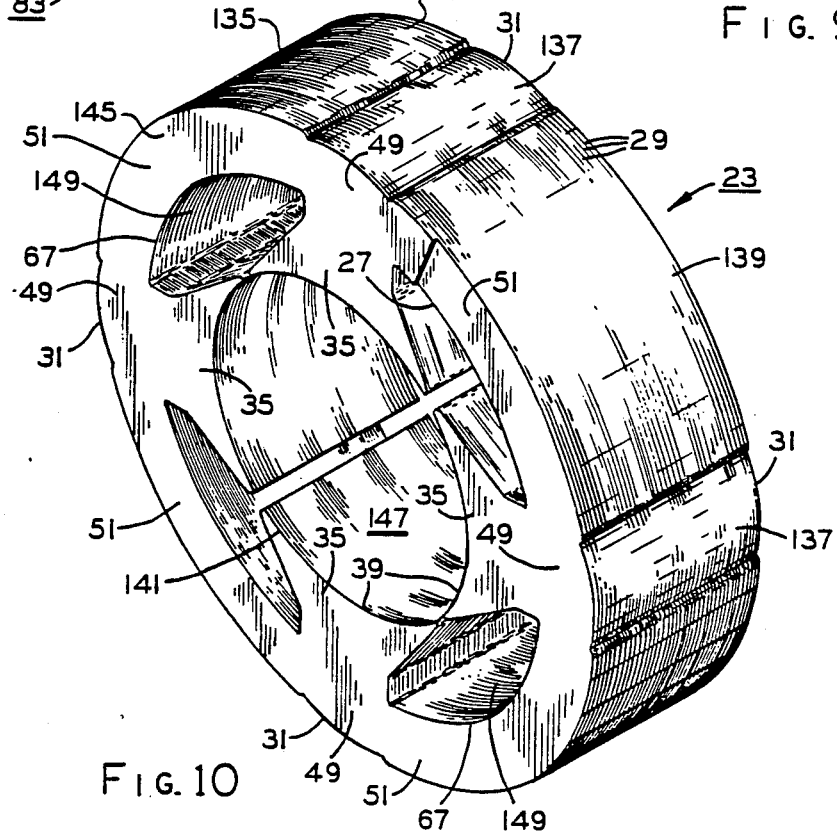
FIG. 10 is a perspective view showing the edgewise wound salient pole core as formed by the apparatus of FIG. 3.

With reference now to the drawings in general there is illustrated a continuous lanced strip 21 of generally thin ferromagnetic material adapted to be edgewise wound into a salient pole core 23 for a salient pole dynamoelectric machine (FIGS. 1, 2 and 10). Lanced strip 21 has a continuous yoke section 25 extending generally lengthwise thereof, and the yoke section includes a pair of opposite edges 27, 29 and a set of spaced apart notches 31 in opposite edge 29 with each notch having an arcuate or base edge 33 therein, respectively (FIGS. 1 and 2). A set of spaced apart salient pole pieces or teeth 35 are integral with opposite edge 27 extending generally laterally from yoke section 25 generally opposite notches 31 therein, and the salient pole teeth include a set of free end sections 37 each having another arcuate edge 39 defining at least a part thereof and with respective ones of base edges 33 and arcuate edges 39 having a common centerpoint 41, respectively (FIG. 1).

More particularly and with specific reference to FIGS. 1 and 2, lanced strip 21 may be lanced or otherwise formed by suitable means well known to the art, such as progressive die sets or the like for instance, from a strip stock 43 of generally thin ferromagnetic material having the desired electrical characteristics and the physical properties desirable to enhance edgewise winding of the lanced strip, as discussed in greater detail hereinafter. Strip stock 43 has a pair of opposite faces 45, 45a (only face 45 being shown in FIGS. 1 and 2) which, of course, bound yoke section 25 and salient pole teeth 35 of lanced strip 21.

Dotted lines 47 indicate the integral interposition or interconnection of a pair of sets of segments 49, 51 provided in yoke section 25 so as to extend generally lengthwise thereof between inner and outer opposite edges 27, 29 on the yoke section, and it may be noted that segments 49 define integral junctures between adjacent ones of segments 51 and salient pole teeth 35, respectively. Salient pole teeth 35 span or are aligned generally about a set of preselected pitch axes 53 therefor which are predeterminately spaced apart from each other generally lengthwise of lanced strip 21, and it may be noted that notches 31 and segments 49 in yoke section 25 also span or are aligned generally about the pitch axes, respectively. Scalloped notches 31 in opposite edge 29 on yoke section 25 are each provided with a pair of opposed side edges or sidewalls 55, 55a with arcuate base edge or base wall 33 being interposed therebetween. It may be noted that the lengths of notches 31 between opposed side edges 55, 55a thereof are no greater than the preselected width of root sections 57 on salient pole teeth 35, and it may also be noted that the apexes of base edges 33 of the notches are arranged to be at least generally coextensive with outer opposite edge 29 on yoke section 25 as discussed in greater detail hereinafter.

Salient pole teeth 35 each have a pair of opposite side edges 59, 59a, and the opposite side edges include first opposite side edge portions 61, 61a and second opposite side edge portions 63, 63a, respectively. First opposite side edge portions 61, 61a intersect with opposite edge 27 on yoke section 25 at least generally at the intersections of segments 49, 51 therein, so denoted by dotted lines 47; therefore, root sections 57 of salient pole teeth 35 and the preselected width of the root sections are defined between the first opposite side edge portions, and the root sections are integrally formed with segments 49 generally at inner opposite edge 27 on yoke section 25, respectively. Second opposite side edge portions 63, 63a intersect with first opposite side edge portions 61, 61a and extend generally divergently therefrom to also intersect with arcuate edge 39, such as a free end edge or tooth tip, provided on each salient pole tooth 35; therefore, each salient pole tooth has its free end section 37 integral with root sections 57 and bounded by the second opposite side edge portions and the arcuate free end edge, respectively. Although previously mentioned, it may be further noted that respective ones of free end edges 39 on salient pole teeth 35 and base edges 33 in notches 31 have common centerpoint 41, as illustrated by radius arrows R1, R2, and it may be further noted that centerpoints 41 are located on pitch axes 53, respectively. Additionally, it may also be noted that the width of free end sections 65 of salient pole teeth 35 generally at free end edges 39 thereof is substantially greater than the width of root sections 57 of the salient pole teeth. While the configuration of salient pole teeth 35 is set out hereinabove for purposes of disclosure, it is contemplated that other salient pole teeth having various different configurations may be utilized on lanced strip 21 within the scope of the invention so as to meet at least some of the objects thereof.

A set of slots 67, such as winding receiving slots or the like for instance, are provided through lanced strip 21 at least adjacent segments 51 in yoke section 25 and between adjacent ones of salient pole teeth 35. Each of slots 67 have a closed end or closed end portion 69 communicating with an open end or open end portion 71 thereof. Closed end portions 69 of slots 67 are defined at least adjacent inner opposite edge 27 on yoke section 25 generally between the intersection therewith of opposed ones of opposite side edges 59, 59a on adjacent ones of salient pole teeth 35, respectively. To complete the description of lanced strip 21, open end portions 71 of slots 67 are arranged to extend generally between the intersections of free end edges 39 on adjacent ones of salient pole teeth 35 with opposed ones of opposite side edges 59, 59a thereon, respectively.

With reference again to the drawings in general and recapitulating at least in part with respect to the foregoing, there is illustrated generally at 81 apparatus for continuously forming edgewise wound salient pole cores 23 from continuous lanced strip 21 (FIGS. 1-12). Apparatus 81 has a die or die means 83 and rotatable or rotation means, such as a rotatable arbor or mandrel 85 or the like for instance, and the die and rotatable mandrel are operable generally for effecting edgewise or flatwise deformation of lanced strip 21 into a plurality of helical convolutions 87 thereof upon the continuous passage at least yoke section 25 of the lanced strip between the die and the rotatable mandrel (FIGS. 3-9). Rotatable mandrel 85 includes a set of generally arcuate means, such as arcuate lands or projections 89 or the like for instance, conjointly rotatable therewith for successively constraining at least parts of inner opposite edge 27 on yoke section 25 between successive salient pole teeth 35 on lanced strip 21 (FIGS. 1, 4 and 5). Die 83 includes means, such as an arcuate surface or die surface 91 or the like for instance, for constraining only spaced parts of outer opposite edge 29 on yoke section 25 of lanced strip 21 which are located generally opposite the at least parts of the inner opposite edge thereon successively constrained by projections 89, respectively (FIGS. 1, 4 and 5).

Figure 3:
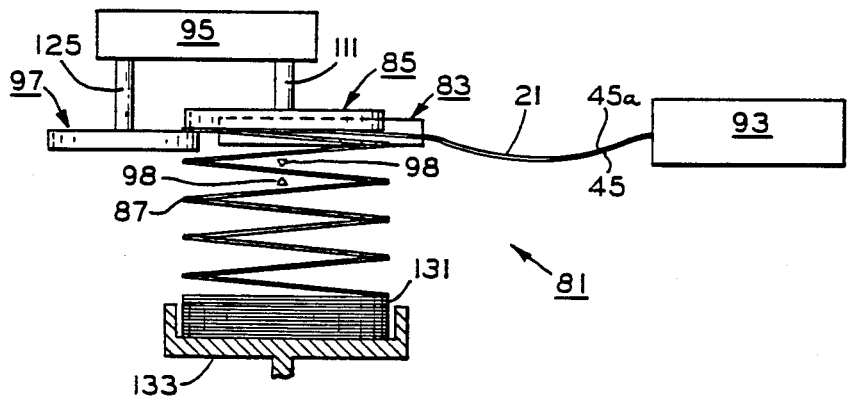
FIG. 3 is a schematic view showing apparatus for continuously forming edgewise wound salient pole cores for a salient pole dynamoelectric machine from the lanced strip of FIG. 1 and illustrating principles which may be practiced in a method of operating such apparatus in one form of the invention as well as principles which may be practiced in a method of forming edgewise wound salient pole cores also in one form of the invention.

More particularly and with specific reference to FIG. 3, apparatus 81 is provided with a source, as indicated schematically at 93, for lanced strip 21, and as well known to the art, such source may comprise a multiple die set for forming the lanced strip from strip stock 43; however, it is also contemplated that such source may comprise a reel or the like of the lanced strip, as also well known to the art. Driving means, as indicated schematically at 95, is operable generally for effecting the conjoint rotation of rotatable mandrel 85 and a rotatable disc, such as a presser or pinch wheel 97 or the like for instance, generally in opposite directions, as illustrated by directional arrows in FIG. 5, and the rotatable mandrel and disc respectively define means for gripping engagement with at least yoke section 25 of lanced strip 21 to effect the continuous passage thereof between die 83 and arcuate projections 89 on rotatable mandrel 85, as discussed in greater detail hereinafter. Means, such as cutters 98 or the like for instance, are operable generally for severing the lanced strip, as discussed hereinafter. In the event a more detailed discussion is required with respect to die 83, rotatable mandrel 85, source 93 or lanced strip 21, driving means 95, cutters 98 or rotatable disc 97, reference may be had to the aforementioned U. S. Pat. No. 4,613,780.

Die 83, which may be referred to as a bending guide or deforming means, comprises a generally elongate block 99 of suitable die material, such as a stainless steel or the like for instance, and a recess 101 in one side of the block provides a flange or guide 103 thereon for generally flatwise receiving lanced strip 21 thereon, as best seen in FIGS. 5 and 6. Arcuate or bending surface 91 of die 83 is provided in recess 101 at least generally adjacent one end of die block 99, such as an exit end thereof for lanced strip 21, and the arcuate die surface is arranged generally adjacent and perpendicular to flange 103 on the die block. A generally straight or guide surface 105 in recess 101 of die block 99 blends with arcuate die surface 91 and extends therefrom through the other end of the die block, such as an entry end thereof for lanced strip 21. At the entry end of die block 99, it may be noted that flange 103 is provided with a slightly beveled or angular surface 107 thereon of a preselected length and against which at least yoke section 25 of lanced strip 21 is generally flatwise received to effect momentary deflection or canting of salient pole teeth 35 on the lanced strip, as best seen in FIGS. 7 and 8 and as discussed in greater detail hereinafter. Albeit not shown herein for purposes of drawing simplification and brevity of disclosure, die block 99 may be resiliently urged by suitable means toward rotatable mandrel 85.

Rotatable mandrel 85 has a generally cylindric head 109 mounted to a spindle or shaft 111 which is rotatably driven by driving means 95 therefor, and the head and shaft are rotatable about a preselected axis 113 therefor which defines a winding axis for apparatus 81, as best seen in FIGS. 3–5. Head 109 is in part disposed in recess 101 of die 83, and a lower, generally annular, flat circumferential surface 115 is provided on the head so as to be disposed in part in spaced apart overlaying relation with flange 103 of die 83 at least generally at arcuate die surface 91 on the die. Arcuate projections 89 are arranged in an interrupted generally circular pattern thereof on head 109 depending therefrom adjacent circumferential surface 115, respectively, as best seen in FIGS. 3–6. A set of arcuate or strip engagement surfaces 117 of a preselected arcuate length are provided on projections 89 intersecting with circumferential surface 115 of head 109, and the projection arcuate surfaces are predeterminately arranged so as to extend generally in opposed radial spaced apart relation with arcuate die surface 91 in recess 101 of die 83 upon the aforementioned rotation of rotatable mandrel relative to the die. In this vein, projection arcuate surfaces 117 are predeterminately arranged in equidistant radially spaced relation about preselected winding axis 113, as indicated by radius arrow R3 in FIG. 5, and the preselected winding axis defines a common centerpoint for both the projection arcuate surfaces and arcuate die surface 91, as illustrated by a radius arrow R4 for the arcuate die surface; therefore, the projection arcuate surfaces and the arcuate die surfaces are predeterminately radially spaced apart when in facing relation with each other. Thus, it may be noted that the aforementioned spaced apart relation of projection arcuate surfaces 117 and arcuate die surface 91 and the spaced overlaying relation of circumferential surface 115 on head 109 with flange 103 in recess 101 of die block 99 generally at the arcuate die surface thereof defines a preselected edgewise deformation passage, zone or path 119 through apparatus 81 between rotatable mandrel 85 and die 83 for the continuous passage therethrough of at least yoke section 25 of lanced strip 21, as discussed in greater detail hereinafter. Of course, the aforementioned predetermined radial spaced relation between projection arcuate surfaces 117 and arcuate die surface 91 is generally dictated by the width between opposite edges 27, 29 on yoke section 25 of lanced strip 21, and the overlaying spaced relation between circumferential surface 115 of head 109 and flange 103 in recess 101 of die block 99 is generally dictated by the thickness of the lanced strip between opposite faces 45, 45a thereof; however, while lanced strip 21 is illustrated herein for purposes of disclosure, it is contemplated that different lanced strips having various different thicknesses and yoke sections with various different widths may be utilized in one form of the invention so as to meet at least some of the objects thereof.

A set of spaces or gaps 121 having a preselected arcuate length or width are provided between adjacent opposed ones of a pair of opposite ends or end portions 123, 123a on each of projections 89, and the opposite end portions of the projections define the aforementioned preselected arcuate lengths thereof, respectively. Gaps 121 are arranged to receive root sections 57 of salient pole teeth 35 on yoke section 25 of lanced strip 21 during the continuous passage thereof through preselected edgewise deformation path 119 of apparatus 81, as discussed in greater detail hereinafter; therefore, it may be noted that the preselected widths of the gaps are predeterminately greater than the preselected widths of the root sections of the salient pole teeth, respectively. As illustrated herein for purposes of disclosure, four projections 89 and four gaps 121 are shown with the projections extending through arcs of generally about seventy degrees (70°) and the gaps extending through arcs of generally about twenty degrees (20°); however, it is contemplated that either more or fewer projections and gaps having various different arcuate lengths may be utilized within the scope of the invention so as to meet at least some of the objects thereof depending, of course, on the number of salient poles of the core being edgewise wound.

Rotatable disc 97 is mounted on a spindle or shaft 125 which is rotatably driven by driving means 95 conjointly with shaft 111 for head 109 of rotatable mandrel 85; therefore, the rotatable disc and mandrel are conjointly rotatable by the driving means, as previously mentioned. To complete the description of apparatus 81, disc 97 is provided with a generally flat, annular circumferential surface 127 disposed in part in opposed or overlaying relation with circumferential surface 115 on head 109 of rotatable mandrel 85, and circumferential surfaces 115, 127 are arranged in gripping engagement with opposite faces 45, 45a of lanced strip 21 on yoke section 25 thereof to draw or effect the continuous passage of at least the yoke section of the lanced strip through preselected edgewise deformation path 119 of the apparatus in response to the conjoint rotation of the rotatable disc and mandrel. The gripping engagement of circumferential surfaces 115, 127 of mandrel 85 and disc 97 with yoke section 25 of lanced strip 21 may be referred to as a pressing or gripping zone. Albeit not shown for purposes of drawing simplification and brevity of disclosure, either rotatable mandrel 85 or rotatable disc 97 may be urged by suitable resilient means toward the other thereof to effect or maintain a desired force of the gripping engagement between mandrel circumferential surface 115 and disc circumferential surface 127 with yoke section of lanced strip 21.

In the operation of apparatus 81, assume that the apparatus has been initially jogged or intermittently operated in a manner well known to the art thereby to place lanced strip 21 and component parts of the apparatus generally in the positions thereof illustrated in FIG. 5, and if a more detailed discussion of the aforementioned initial jogging of the apparatus to initially associate the lanced strip therewith is desired, reference may be had to the aforementioned U.S. Pat. No. 4,613,780. As may be best seen in FIGS. 3–6, lanced strip 21 is continuously fed or passed from source 93 thereof into die 83, and yoke section 25 of the lanced strip is generally flatwise engaged with flange 103 on the die block 99, i.e., opposite face 45a of the lanced strip on the yoke section thereof is arranged in facing relation or sliding engagement with the die flange, while outer opposite edge 29 on the yoke section is disposed in guiding or sliding engagement with guide surface 105 in the die block. Thus, in response to the clockwise rotation of mandrel 85 by driving means 95, as indicated by the rotational arrow therefor in FIG. 5, it may be noted that arcuate surfaces 117 on projections 89 of the mandrel are successively and independently rotated into constraining or edgewise deforming engagement with only inner opposite edges 27 on yoke section 25 of lanced strip 21 between adjacent or successive ones of salient pole teeth 35 thereon. As each arcuate surface 117 on projections 89 of mandrel 85 are rotated thereby through preselected edgewise deformation path or bending zone 119 between the mandrel and die 83 so as to be disposed in opposed facing relation with arcuate die surface 91, it may also be noted that only successive or spaced apart parts of outer opposite edge 29 on yoke section 25 of lanced strip 21 are disposed in constraining or edgewise deforming engagement with the arcuate die surface, and such spaced apart parts of the outer opposite edge are located on the yoke section generally opposite the parts of inner opposite edges 27 thereof between adjacent salient pole teeth 35 so as to be in constraining or deformation engagement with arcuate surfaces 117 on mandrel projections 89, respectively. In other words, only segments 51 in yoke section 25 of lanced strip 21 are edgewise or arcuately deformed during the passage of the lanced strip through preselected edgewise deformation path 119 between die 83 and rotatable mandrel 85 in response to the constraining engagement of inner and outer opposite edges 27, 29 on only segments 51 in the yoke section between successive projection arcuate surfaces 117 and arcuate die surface 91 when such projection arcuate surfaces are in opposed facing relation with the arcuate die surface, respectively.

During the above discussed continuous passage of yoke section 25 on lanced strip 21 through bending zone 119 between die 83 and rotatable mandrel 85 to effect the successive edgewise deformation of only segments 51 in the yoke section, root sections 57 on adjacent or successive ones of salient pole teeth 35 are received in successive ones of gaps 121 between projections 84 on the rotatable mandrel in response to the rotation thereof, as best seen in FIG. 7. It may be noted that salient pole teeth 35 on lanced strip 21, segments 49 in yoke section 25 of the lanced strip, and parts of outer opposite edge 29 on the yoke section bounding segments 49 are unconstrained between free end edges 39 of teeth 35 and arcuate edges 33 of notches 31 and thereby left undeformed, i.e., maintained in their original lanced configuration or condition, in response to the passage of segments 49 in the yoke section of the lanced strip through bending zone 119 of apparatus 81 between die 83 and rotatable mandrel 85 thereof, respectively. Thus, as illustrated in FIG. 7, the parts of outer opposite edge 29 on yoke section 25 bounding segments 49 therein are unconstrained by arcuate die edge 91 being displaced therefrom, respectively.

As lanced strip 21 is passed from source 93 thereof into the entry end of die 83, as best seen in FIGS. 3, 5 and 7, yoke section 25 of the lanced strip and root sections 57 of salient pole teeth 35 pass over or slide upon beveled surface 107 on flange 103 of die block in general flatwise relation or sliding engagement therewith. Therefore, the instantaneous engagement of that portion of yoke section 25 and that root section 57 of a particular one of salient pole teeth 35 with beveled surface 107 on flange 103 of die block 99 is effective to cause a deflection or canting of such particular one salient pole tooth through a preselected angularity so as to obviate interfering engagement between a free end section 37 thereof and an end portion 123 of one of the projections 89 on rotatable mandrel 85 being rotated thereby toward the above discussed edgewise constraining engagement with one of segments 51 on the yoke section, respectively. In view of the above, it may be noted that salient pole teeth 35 on lanced strip 21 are predeterminately deflected from the path of projections 89 rotatable with mandrel 85 in order to obviate interfering engagement or abutment of free end sections 37 on the salient pole teeth with the projections on the rotatable mandrel. However, the free end section 37 of the particular deflected salient pole tooth 35 may engage or ride on a projection 89 as it is being rotated by rotatable mandrel toward bending zone 119 of apparatus 81 until a gap 121 between adjacent projections passes over the root section 57 of the particular deflected salient pole tooth in receiving relation therewith thereby to permit the particular deflected salient pole tooth to reassume its generally coplanar relation with yoke section 25 in lanced strip prior to the passage thereof through bending zone 119 in apparatus 81.

The previously discussed successive edgewise deformations of only segments 51 in yoke section 25 of lanced strip 21 while leaving segments 49 therein and salient pole teeth 35 undeformed during the passage of the lanced strip through bending zone 119 of apparatus 81 effects the edgewise deformation of the lanced strip into a plurality of generally helical convolutions 87 thereof, as best seen in FIGS. 3 and 4. Even though salient pole teeth 35 are undeformed, it may be noted that pitch axes 53 therefor are repositioned so as to extend generally radially with respect to helical convolutions 87 in response to the edgewise deformation of segments 57, respectively. Of course, the helical convolutions 87 of deformed lanced strip 21 passing from the exit end of die 83 is grippingly engaged between overlaying circumferential surfaces 115, 127 of rotatable mandrel 85 and rotatable disc 97, a best seen in FIGS. 4 and 5, and the gripping engagement of circumferential surfaces 115, 127 with yoke section 25 of such deformed helical convolution of the lanced strip is effective to draw or move the lanced strip from its source 93 through bending zone 119 of apparatus 81, as previously discussed.

Helical convolutions 87 of deformed lanced strip 21 passing from the exit end of die 83 are accumulated in a generally annular stack 131 thereof on a receiving means, such as a receiver or support 133 therefor, as best seen in FIG. 3. As helical convolutions 87 of deformed lanced strip 21 are accumulated in annular stack 131 thereof on receiver 133, yoke section 21 of the deformed lanced strip is disposed generally circumferentially about the annular stack, and the deformed parts of outer opposite edge 29 bounding deformed segments 51 in the yoke section and the undeformed parts of the outer opposite edge bounding undeformed segments 49 in the yoke section are arranged to form a generally circumferential surface 135 extending about the yoke section and generally axially across the annular stack. Further, during the aforementioned accumulation of helical convolutions 87 of deformed lanced strip 21 into annular stack 131, undeformed and deformed segments 49, 51 and salient pole teeth 35 are arranged or associated generally in pluralities of row formations 137, 139, 141 thereof extending generally axially across the annular stack with the salient pole teeth extending generally radially inwardly about their repositioned pitch axes 53 from the yoke section of the deformed lanced strip, respectively. At least generally as helical convolutions 87 of deformed lanced strip 21 accumulated in annular stock 131 thereof attain a preselected axial length or stack height for the annular stack, severing means or cutters 98 may be actuated in a manner well known to the art to sever one of the helical convolutions of the deformed strip. Albeit not shown for the sake of drawing simplification and brevity of disclosure, annular stack 131 may be removed from its receiver 133 subsequent to the operation of cutters 98 so that another annular stack of helical convolutions of the deformed strip may be accumulated on such receiver without interrupting the operation apparatus 81 to continuously form such helical convolutions of the deformed lanced strip. If a more detailed discussion of the constructions and/or operations of cutters 98 and receiver 133 is desired, reference may be had to the aforementioned U.S. Pat. No. 4,613,780.

Figure 11:
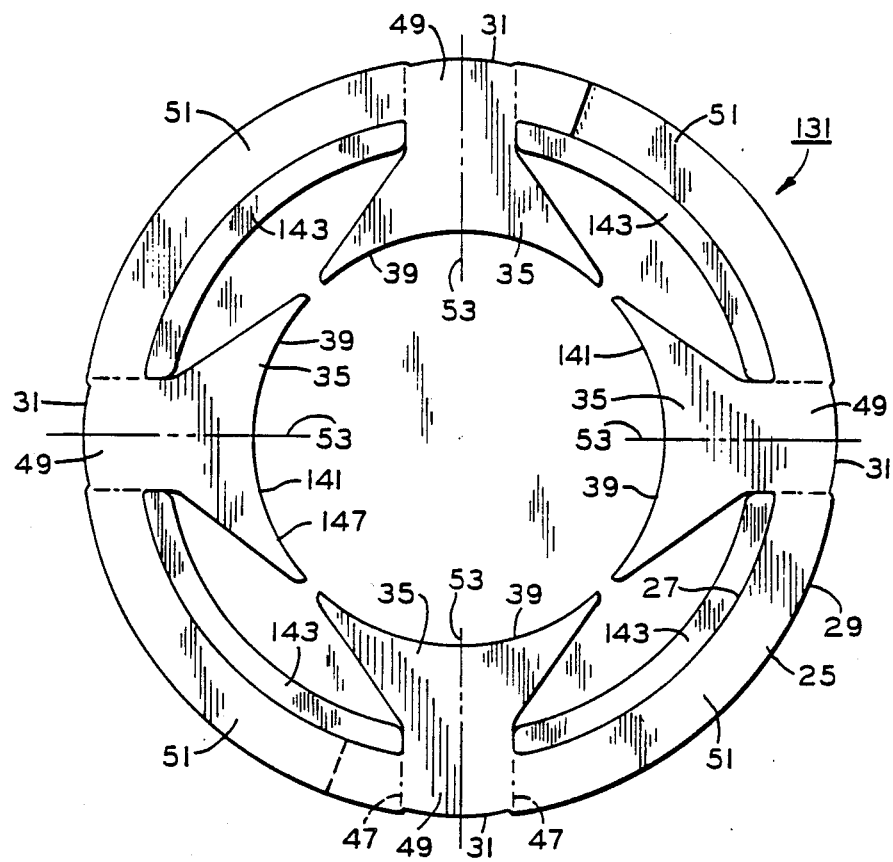
FIG. 11 is an end elevational view of the edgewise wound salient pole core of FIG. 10 and illustrating the axial alignment of the component parts of the edgewise wound salient pole core thereacross on an aligning fixture.

Upon removal of such helical convolution stack 131 from receiver 133 therefor, such stack is placed about or associated with an aligning arbor 143, as shown in part in FIG. 11, in a manner well known to the art, and helical convolutions 87 in such stack are easily adjusted or repositioned with respect to each other to effect the axial alignment of undeformed segments 49, deformed segments 51 and undeformed salient pole teeth 35 into the axial row formations 137, 139, 141 thereof between a pair of opposite end faces 145, 145a on such stack thereby to define an edgewise wound core 23. Upon the above discussed alignment of helical convolution stack 131 on aligning arbor 143, free end edges 39 on salient pole teeth 35 in the axial row formations 141 thereof define in part an axially extending bore 147 through core 23 between opposite end faces 145, 145a thereon, and slots 67 in deformed lanced strip 21 are also disposed in pluralities of axial row formations 149 thereof between the aligned salient pole teeth so as to intersect with the opposite end faces on the edgewise wound core thereby to define winding receiving slots in such core, respectively. As previously mentioned, pitch axes 53 for salient pole teeth 35 are repositioned so as to extend generally radially with respect to core 23. Further, it may also be noted that, notches 31 in the undeformed parts of outer opposite edge 29 bounding undeformed segments 49 are also arranged in pluralities of aligned axial row formations in circumferential surface 135 of core 23 between opposite end faces 145, 145a thereof, and the arcuate base edges 33 of the notches serve to blend the undeformed parts of outer opposite edge 29 with the deformed parts thereof on deformed segments 51, respectively.

Figure 9:
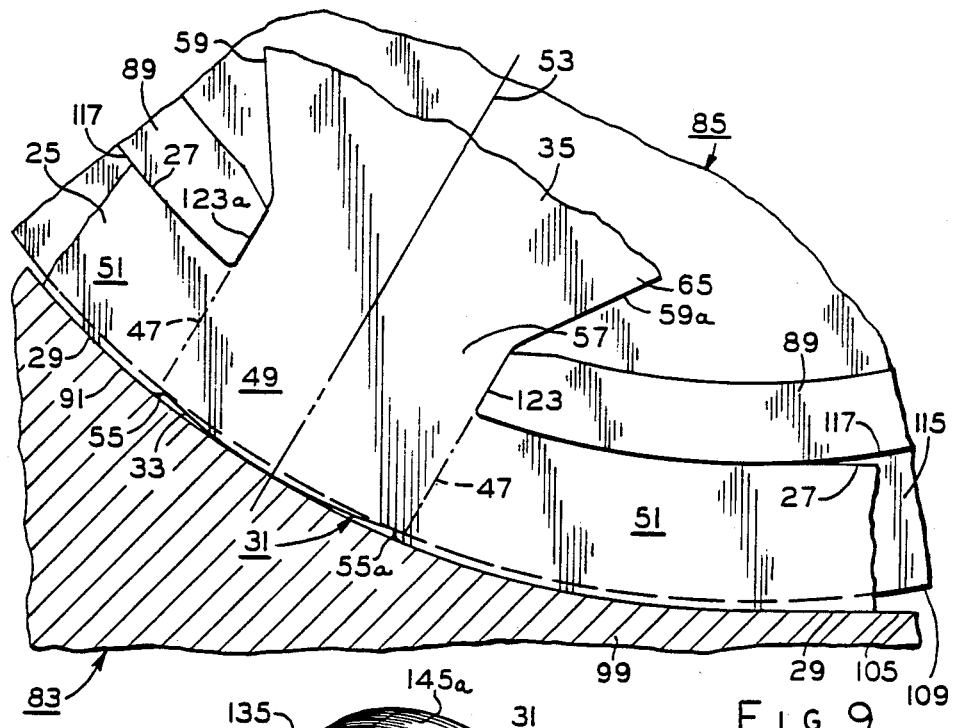
FIG. 9 is an enlarged elevational view taken from FIG. 5 but illustrating the unconstrained passage of an undeformed salient pole tooth and yoke segment associated therewith of the lanced strip between a mandrel and die for effecting edgewise deformation of the lanced strip.

With further reference to the drawings in general and again recapitulating at least in part with respect to the foregoing, there is illustrated in one form of the invention a method of operating apparatus 81 for continuously forming edgewise wound salient pole cores 23 from continuous lanced strips 21 (FIGS. 1-12). In practicing this method, mandrel 85 is rotated relative to die 81 with continuous lanced strip 21 being passed therebetween (FIGS. 3-9). Arcuate projections 89 on mandrel 85 are successively engaged with at least parts of inner opposite edge 27 on yoke section 21 of the continuous lanced strip between adjacent ones of salient pole teeth 35, and thereby only parts of outer opposite edge 29 on the yoke section disposed generally opposite the parts of the inner opposite edge successively engaged by the projections are successively constrained in engagement with arcuate surface 91 on die 83 so as to effect edgewise deformation of the continuous lanced strip into helical convolutions 87 thereof in response to the rotation of the mandrel relative to the die, respectively (FIGS. 5, 6 and 9).

Figure 12:
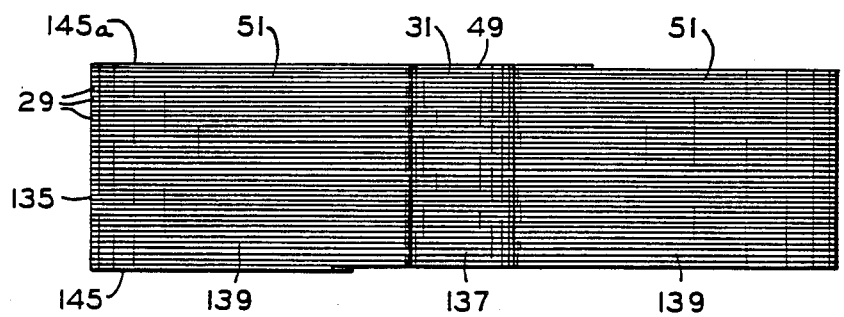
FIG. 12 is a side elevational view of the edgewise wound salient pole core of FIG. 11.

Also, edgewise wound core 23 comprises continuous lanced strip 21 generally edgewise and helically wound into the core (FIGS. 10-12). Deformed segments 51 and undeformed segments 49 are integrally interposed between each other in continuous lanced strip 21 and arranged generally in pluralities of generally axially extending row formations 137, 139 across core 23, and the row formations of the deformed and undeformed segments define a generally circumferential yoke section 21 of the core, respectively (FIG. 9). Undeformed salient pole teeth 35 on continuous lanced strip 21 integral with undeformed segments 49 thereof are arranged about pitch axes 53 therefor in pluralities of row formations 141 thereof so as to define in part generally axial bore 147 therein, respectively (FIGS. 10 and 11).

Further, a method in one form of the invention is illustrated from the foregoing for forming an edgewise wound salient pole core 23 (FIGS. 1-12). In practicing this method, successive segments 51 in yoke section 25 of lanced strip 21 are successively and independently edgewise constrained along at least a part thereof, and salient pole teeth 35 and segments 49 are left unconstrained (FIGS. 5 and 9). Only the at least parts of edgewise constrained segments 51 are successively and independently deformed, and the constrained salient pole teeth 35 and segments 49 are maintained in the original lanced configurations thereof (FIGS. 5, 10 and 11).

From the foregoing, it is now apparent that a novel method of forming an edgewise wound salient pole core and a novel method of operating apparatus for continuously forming edgewise wound cores have been presented meeting the objects set forth hereinabove, as well as others, and it is contemplated that changes as to the precise arrangements, shapes, connections and details of the constructions illustrated herein by way of example for purposes of disclosure, as well as the precise steps and order thereof of such methods, may be made by those having ordinary skill in the art without departing from the spirit of the invention or the scope thereof which is defined by the claims which follow.

What I claim as new and desire to secure by Letters Patent of the U.S. is:

1. A method of forming an edgewise wound core from a lanced strip of generally thin ferromagnetic material, the lanced strip including a yoke section extending generally lengthwise thereof and having a pair of generally opposite edges, a set of spaced apart segments in the yoke section between the opposite edges thereof, a set of junctures in the yoke section between the opposite edges thereof and integrally interconnected between adjacent segments, a set of pitch axes predeterminately positioned generally perpendicular to the opposite edges and equally spaced apart generally lengthwise of the lanced strip, a set of salient pole pieces integrally interconnected with said junctures generally at one of the opposite edges on the yoke section and extending generally laterally therefrom, the salient pole pieces and the junctures being aligned generally about the pitch axes, respectively, the method comprising the steps of:

moving the lanced strip generally along its length and passing at least the yoke section of the lanced strip through a preselected edgewise deformation path therefor;

successively constraining at least a part of the one opposite edge on successive segments in the yoke section between adjacent salient pole pieces and at least a part of the other of the opposite edges on the successive segments generally opposite the at least part of the one opposite edge thereon during the passing step, respectively;

deforming successively and generally edgewise at least a part of the successive segments bounded by the constrained at least part of the one and other opposite edges and maintaining the original lanced configurations of the junctures and the salient pole pieces between the deformed successive segments upon the passage of at least the yoke section of the lanced strip through the preselected edgewise deformation path therefor, respectively;

effecting the deformation of the lanced strip into a plurality of generally helical convolutions thereof and repositioning the pitch axes to extend generally radially with respect to the helical convolutions of the lanced strip and with the junctures and the salient pole pieces in their original lanced configurations extending in the aligned relation thereof about the repositioned pitch axes in response to the deforming step, respectively;

accumulating the helical convolutions of the deformed lanced strip in a generally annular stack thereof, respectively;

disposing the yoke section of the deformed lanced strip in the helical convolutions thereof generally circumferentially about the annular stack and arranging the other opposite edge on the yoke section of the lanced strip in the helical convolutions thereof to form a generally circumferential surface extending about the yoke section across the annular stack during the accumulation step, respectively;

arranging the deformed segments and the junctures in their original lanced configurations in the yoke section of the deformed lanced strip in the helical convolutions thereof so as to extend generally in sets of row formations thereof about the annular stack and generally axially thereacross and associating the salient pole pieces in their original lanced configurations and aligned relation about the repositioned pitch axes so as to extend in sets of row formations thereof generally axially across the annular stack during the disposing step, respectively;

severing one of the helical convolutions of the deformed lanced strip at least generally as the annular stock attains a preselected stack height therefor; and aligning the sets of the deformed segments, the junctures and the teeth in their original lanced configurations into the row formations thereof generally axially across the annular stack, respectively, thereby to define the edgewise wound core.

2. A method of forming an edgewise wound core from a lanced strip of generally thin ferromagnetic material, the lanced strip including a yoke section extending generally lengthwise thereof and having a pair of generally opposite edges, a set of segments and a set of junctures in the yoke section between the opposite edges thereof with the junctures being integrally interposed between adjacent segments, and a set of salient pole teeth integrally formed with the junctures generally at one of the opposite edges of the yoke section and extending generally laterally therefrom, respectively, the method comprising the steps of:

constraining successively and independently only the opposite edges on successive segments along at least a part thereof, respectively.

edgewise deforming successively and independently the at least parts of the successive segments generally at the constrained opposite edges thereon and maintaining the original lanced configurations of the junctures and the salient pole teeth between the edgewise deformed successive segments, respectively.

3. The method as set forth in claim 2 wherein the constraining step includes confining at least a part of the one opposite edge on the successive segments between adjacent ones of the salient pole teeth and at least a part of the other of the opposite edges on the successive segments located generally opposite the at least part of the one opposite edge, respectively.

4. The method as set forth in claim 2 wherein the edgewise deforming step includes passing at least the yoke section of the lanced strip through a preselected edgewise deformation path therefor.

5. The method as set forth in claim 2 wherein the edgewise deforming step includes effecting the deformation of the lanced strip into a plurality of generally helical convolutions thereof and repositioning the salient pole teeth and the junctures in the original lanced configurations thereof so as to extend generally radially with respect to the helical convolutions of the deformed lanced strip, respectively.

6. The method as set forth in claim 5 further comprising the additional step of accumulating the helical convolutions of the deformed lanced strip into a generally annular stack thereof.

7. The method as set forth in claim 6 wherein the accumulating step includes disposing the yoke section of the deformed lanced strip in the helical convolutions thereof generally circumferentially about the annular stack with the other opposite edge on the yoke section defining a generally circumferential surface about the annular stack, respectively.

8. The method as set forth in claim 7 further comprising the additional step of aligning the deformed segments and the salient pole teeth and the junctures in their original lanced configurations so as to extend in sets of row formations thereof generally axially across the annular stack, respectively, thereby to define the edgewise wound core.

9. A method of forming an edgewise wound core from a continuous lanced strip of generally thin ferromagnetic material, the continuous lanced strip including a yoke section extending generally lengthwise thereof and having a pair of generally opposite edges, a pair of sets of segments in the yoke section between the opposite edges thereof with the segments of one of the segment sets being integrally interposed between adjacent segments of the other of the segment sets, and a set of salient pole teeth integrally formed with the segments of one of the one and other segment sets at least generally at one of the opposite edges on the yoke section and extending generally laterally therefrom, respectively, the method comprising the steps of:

constraining successively and independently the opposite edges on each successive segment of the other of the one and other segment sets along at least a part thereof and leaving the salient pole teeth and the segments of the one of the one and other segment sets unconstrained, respectively; and edgewise deforming successively and independently only the at least parts of the successive segments of the other of the one and other segment sets generally at the constrained opposite edges thereon, respectively.

10. The method as set forth in claim 9 wherein the edgewise deforming step includes maintaining the unconstrained salient pole teeth and the segments of the one of the one and other segment sets in their original lanced configurations, respectively.

11. The method as set forth in claim 9 wherein the edgewise deforming step includes passing at least the yoke section of the lanced strip through a preselected edgewise deformation path therefor.

12. The method as set forth in claim 9 wherein the lanced strip further includes a set of pitch axes spaced generally along the length thereof and positioned generally perpendicular to the opposite edges, the salient pole teeth and the segments of the one of the one and other segment sets extending about the pitch axes, respectively and wherein the edgewise deforming step includes effecting the deformation of the lanced strip into a plurality of generally helical convolutions thereof and repositioning the pitch axes so as to extend generally radially with respect to the helical convolutions of the deformed lanced strip while maintaining the unconstrained salient pole teeth and the segments of the one of the one and other segment sets in their original lanced configurations about the pitch axes, respectively.

13. The method as set forth in claim 9 wherein the edgewise deforming step includes effecting the deformation of the lanced strip into a plurality of generally helical convolutions thereof and repositioning the salient pole teeth and the segments of the one of the one and other segment sets in their original lanced configurations so as to extend generally radially with respect to the helical convolutions of the deformed lanced strip, respectively.

14. The method as set forth in claim 13 further comprising the additional step of accumulating the helical convolutions of the deformed lanced strip in a generally annular stack thereof.

15. The method as set forth in claim 9 wherein the lanced strip further includes a set of notches in the segments of the one of the one and other segment sets generally opposite the salient pole teeth and intersecting with the other opposite edge of the yoke section with the notches having a set of generally arcuate edges and wherein the edgewise deforming step includes blending the arcuate edges of the notches at least in part with the other opposite edge extending along the at least part of the edgewise deformed segments of the other of the one and other segment sets, respectively.

16. A method of forming an edgewise wound core from a lanced strip of generally thin ferromagnetic material, the lanced strip including a plurality of sets of segments extending generally lengthwise thereof with the segments of one of the segment sets being disposed between adjacent segments of another of the segment sets, and a set of salient pole teeth integral with the segments of one of the one and another segment sets and extending generally laterally therefrom, respectively, the method comprising the steps of:
  edgewise containing successively and independently each successive segment of the other of the one and another segment sets along at least a part thereof and leaving the salient pole teeth and the segments of the one of the one and another segment sets unconstrained; and
  edgewise deforming successively and independently only the at least parts of the edgewise constrained segments of the other of the one and another segment sets in response to the edgewise constraining step and maintaining the e unconstrained salient pole teeth and segments of the one of another segment sets in the original lanced configurations thereof during the edgewise deforming step, respectively.

17. The method as set forth in claim 16 wherein the edgewise deforming step includes effecting the edgewise deformation of the lanced strip into a plurality of generally helical convolutions thereof.

18. The method as set forth in claim 17 further comprising the additional step of accumulating the helical convolutions of the deformed lanced strip into a generally annular stack thereof.

19. The method as set forth in claim 18 wherein the accumulating step includes disposing the segments of the one and another segment sets in the yoke section of the deformed lanced strip in the helical convolution thereof generally circumferentially about the annular stack and extending the unconstrained salient pole teeth generally radially with respect to the segments of the one of the one and another segment sets, respectively.

20. The method as set forth in claim 19 wherein the accumulating step further includes arranging the segments in the one and another segment sets and the salient pole teeth so as to extend generally in sets of row formations thereof across the annular stack, respectively.

21. The method as set forth in claim 17 wherein the edgewise deforming step includes passing at least the segments of the one and another segment sets through a predetermined edgewise deformation path.

22. The method as set forth in claim 21 further comprising the additional step of deflecting at least the segments of the one of the one and another segment sets and the unconstrained salient pole teeth associated therewith at least upon the entry of the segments of the one of the one and another segment sets into the preselected edgewise deformation path, respectively.

23. A method for forming an edgewise wound core from a lanced strip of generally thin ferromagnetic material, the lanced strip including a yoke section extending generally lengthwise thereof, and a set of spaced apart salient pole teeth integral with the yoke section and extending generally laterally therefrom, the method comprising the steps of:
  passing at least the yoke section of the lanced strip through a preselected edgewise deformation path therefor with the lanced strip being disposed at least generally in a planar attitude during at least a part of the passage of at least the yoke section through the preselected edgewise deformation of the lanced strip into a plurality of generally helical convolutions thereof, respectively; and
  momentarily deflecting at least successive spaced apart parts of the yoke section and successive salient pole teeth associated therewith into another preselected attitude displaced in a direction away from the generally planar attitude of the lanced strip during the at least part of the passage of at least the yoke section through the preselected edgewise deformation passage at least upon the entry of the yoke section into the preselected edgewise deformation path and prior to the effecting step.

24. The method as set forth in claim 23 further comprising the additional step of continuously exerting a force on the respective ones of the helical convolutions immediately exiting the preselected edgewise deformation path thereby to effect the passage of at least the yoke section through the preselected edgewise deformation path.

25. The method as set forth in claim 23 further comprising the additional step of accumulating the helical convolutions in a generally annular stack thereof.

26. The method as set forth in claim 25 further comprising the further additional step of severing one of the helical convolutions at least generally as the annular stack attains a preselected stack height thereby to define one of the cores.

27. The method as set forth in claim 23 wherein the effecting step includes edgewise containing only other spaced apart parts of the yoke section respectively interposed between adjacent ones of the first named successive spaced apart parts of the yoke section.

28. The method as set forth in claim 23 wherein the effecting step includes maintaining the successive spaced apart parts of the yoke section and the successive salient pole teeth in the original lanced configurations thereof, respectively.

29. A method of operating apparatus for continuously forming edgewise wound cores from a continuous lanced strip of generally thin ferromagnetic material, the continuous lanced strip including a yoke section extending generally lengthwise thereof, a pair of generally opposite edges on the yoke section, and a set of spaced apart salient pole teeth integral with one of the opposite edges on the yoke section and extending generally laterally therefrom, the apparatus including a die having an arcuate surface thereon, and a rotatable mandrel having a set of arcuate projections thereon, respectively, the method comprising the steps of:
rotating the mandrel relative to the die with the continuous lanced strip being passed therebetween; and
successively engaging the arcuate projections on the mandrel only with at least parts of the one opposite edge on the yoke section of the continuous lanced strip between adjacent ones of the salient pole teeth and successively constraining thereby in engagement with the arcuate surface on the die only parts of the other of the opposite edges on the yoke section disposed generally opposite the parts of the one opposite edge successively engaged by the arcuate projections so as to effect edgewise deformation of the continuous lanced strip into a plurality of generally helical convolutions thereof, respectively.

30. The method as set forth in claim 29 wherein the mandrel further has a set of gaps between adjacent ones of the arcuate projections thereon and wherein the successively constraining step includes successively receiving successive ones of the salient pole teeth in the gaps and obviating thereby constraint of the salient pole teeth and said arcuate projections, respectively.

31. The method as set forth in claim 29 wherein the apparatus further includes a disc arranged in part in overlaying relation with a part of the mandrel and wherein the rotating step includes conjointly rotating the disc with the mandrel and gripping in engagement between the disc and the mandrel part at least a part of the yoke section of the edgewise deformed continuous lanced strip in one of the helical convolutions thereof so as to effect the passage of the continuous lanced strip between the mandrel and the die.

32. The method as set forth in claim 29 wherein the apparatus further includes a core receiver and wherein the method further comprises the additional step of accumulating the helical convolutions of the edgewise deformed continuous lanced strip in a generally annular stack thereof on the core receiver.

33. The method as set forth in claim 32 wherein the apparatus further includes means operable generally for severing the edgewise deformed continuous lanced strip and wherein the method further comprises the further additional step of effecting the operation of the severing means and severing one of the helical convolutions of the edgewise deformed continuous lanced strip at least generally as the annular stack thereof on the core receiver attains a preselected stack height.

34. The method as set forth in claim 29 wherein the die also has a deflecting surface and wherein the method further comprises the intermediate step of engaging the lanced strip at least in part with the deflecting surface and momentarily deflecting each successive tooth to a position displaced from the rotating path of respective ones of the arcuate projections prior to the successive engagement thereof only with the at least parts of the one opposite edge on the yoke section of the continuous lanced strip.

35. The method as set forth in claim 34 wherein the momentarily deflecting step includes obviating interfering engagement between the teeth and the respective ones of the arcuate projections, respectively, so as to maintain the passage of the continuous lanced strip between the die and the mandrel.

36. The method as set forth in claim 34 wherein the mandrel further has a set of gaps between adjacent ones of the arcuate projections, and wherein the intermediate step includes returning the teeth from the displaced position into a generally coplanar positions with respect to the continuous lanced strip and receiving the teeth in part within the gaps upon the return of the teeth toward the coplanar positions thereof, respectively.

37. A method of operating apparatus for forming edgewise wound salient pole cores from a continuous lanced strip of generally thin ferromagnetic material, the lanced strip including a yoke section extending generally lengthwise thereof, and a plurality of spaced apart salient pole teeth extending generally laterally from the yoke, the apparatus including a die having a deflection surface thereon, and a rotatable mandrel having a set of generally arcuate projections thereon, the method comprising the steps of:
rotating the mandrel and conjointly moving the arcuate projections in a generally circular path relative to the die;
passing the lanced strip continuously between the die and the mandrel;
edgewise deforming only spaced apart segments of the yoke between the die and respective successive ones of the arcuate projections in response to the movement of the arcuate projections in their path upon the passage of the lanced strip between the die and the mandrel;
engaging the lanced strip in part with the deflection surface during the passing step and momentarily deflecting each successive tooth to a position displaced from the path of the next respective successive ones of the arcuate projections immediately following the first named respective successive ones of the arcuate projections prior to the edgewise deforming step.

38. The method as set forth in claim 37 wherein the momentarily deflecting step includes obviating interfering engagement between the teeth and the next respective successive ones of the arcuate projections, respectively, so as to maintain the continuous passage of the lanced strip between the die and the mandrel.

39. The method as set forth in claim 37 wherein the edgewise deforming step includes maintaining the teeth and other segments of the yoke section arranged intermediate adjacent ones of the first spaced apart named segments and associated with the teeth at least generally in the original lanced configurations thereof, respectively.

40. The method as set forth in claim 37 wherein the edgewise deforming step includes constraining only the spaced apart segments at least generally edgewise thereof between the die and the first named respective successive ones of the arcuate projections, respectively.

41. The method as set forth in claim 37 wherein the apparatus further includes a set of gaps between adjacent ones of the arcuate projections, and wherein the method further comprises the intermediate step of returning each successive tooth from its displaced position prior to the edgewise deforming step for the passage of the lanced strip between the die and the mandrel and receiving the teeth in part within the gaps in response to the returning step and prior to the edgewise deforming step, respectively.

42. The method as set forth in claim 37 further comprising the additional step of forming the edgewise deformed lanced strip into a plurality of generally helical convolutions thereof.

43. The method as set forth in claim 42 further comprising the further additional steps of accumulating the helical convolutions in a generally annular stack thereof and severing one of the helical convolutions at least generally as the stack attains a preselected stack height thereby to define one of the cores.

44. The method as set forth in claim 42 further comprising the further additional steps of gripping at least in part the yoke section in respective ones of the helical convolutions exiting from the die and continuously exerting a force on the respective ones of the helical convolutions to effect the continuous passage of the lanced strip between the die and the mandrel.

45. A method of operating apparatus for continuously forming edgewise wound cores from a continuous lanced strip of generally thin ferromagnetic material, the lanced strip including a yoke section extending generally lengthwise thereof, a plurality of sets of segments in the yoke section with the segments of one of the segment sets being interposed between the segments of another of the segment sets, and a set of salient pole teeth associated with the segments of one of the one and another segment sets so as to extending generally laterally therefrom, the apparatus including a die, and a rotatably mandrel having a st of arcuate projections thereon, the method comprising the steps of:
rotating the mandrel and conjointly moving the arcuate projections in a preselected path relative to the die;
passing the continuous lanced strip continuously between the die and the rotating mandrel; and
edgewise constraining only the segments of the other of the one and another segment sets between at least a part of the die and respective successive ones of the arcuate projections and leaving the salient pole teeth and the segments of the one of the one and another segment sets unconstrained, respectively, during the passing step.

46. The method set forth in claim 45 wherein the edgewise constraining step includes forming the continuous lanced strip generally edgewise thereof into a plurality of helical convolutions.

47. The method as set forth in claim 46 further comprising the additional steps of accumulating the helical convolutions in a generally annular stack thereof and severing at least the yoke section in one of the helical convolutions at least generally as the annular stack attains a preselected stack height thereby to define one of the cores.

48. The method as set forth in claim 45 wherein the yoke section includes a pair of sets of generally opposite interrupted edges at least in part defining the segments of the other of the one an another segment sets, the teeth being interposed between adjacent opposite interrupted edges of one of the edge sets, and a set of notches in the yoke section interposed between adjacent opposite interrupted edges of the other of the edge sets, respectively, the die including a generally arcuate surface, and wherein the edgewise constraining step includes successively engaging only the opposite interrupted edges of the one and other edge sets with the arcuate surface of the die and the respective successive ones of the arcuate projections and edgewise deforming only the segments of the other of the one and another segment sets in response to the successively engaging step, respectively.

49. The method as set forth in claim 45 wherein the die includes a deflection surface, and wherein the method further comprises the intermediate step of engaging the continuous lanced strip with the deflection surface and momentarily deflecting each successive tooth into a position displaced from the path of the next respective successive ones of the arcuate projections following the first named respective successive ones of the arcuate projections prior to the edgewise constraining step.

50. The method as set forth in claim 49 wherein the deflecting step includes obviating interfering engagement between each successive tooth and the next respective successive ones of the arcuate projections, respectively, so as to maintain the continuous passage of the lanced strip between the die and the mandrel.

51. The method as set forth in claim 49 wherein the mandrel also has a set of gaps interposed between the arcuate projections, respectively, and wherein the method further comprises the further intermediate step of successively returning the teeth from their displaced positions prior to the edgewise constraining step for the continuous passage with the continuous lanced strip between the die and the mandrel and receiving the teeth in part within respective successive ones of the gaps in response to the returning step.

* * * * *